UNITED STATES PATENT OFFICE.

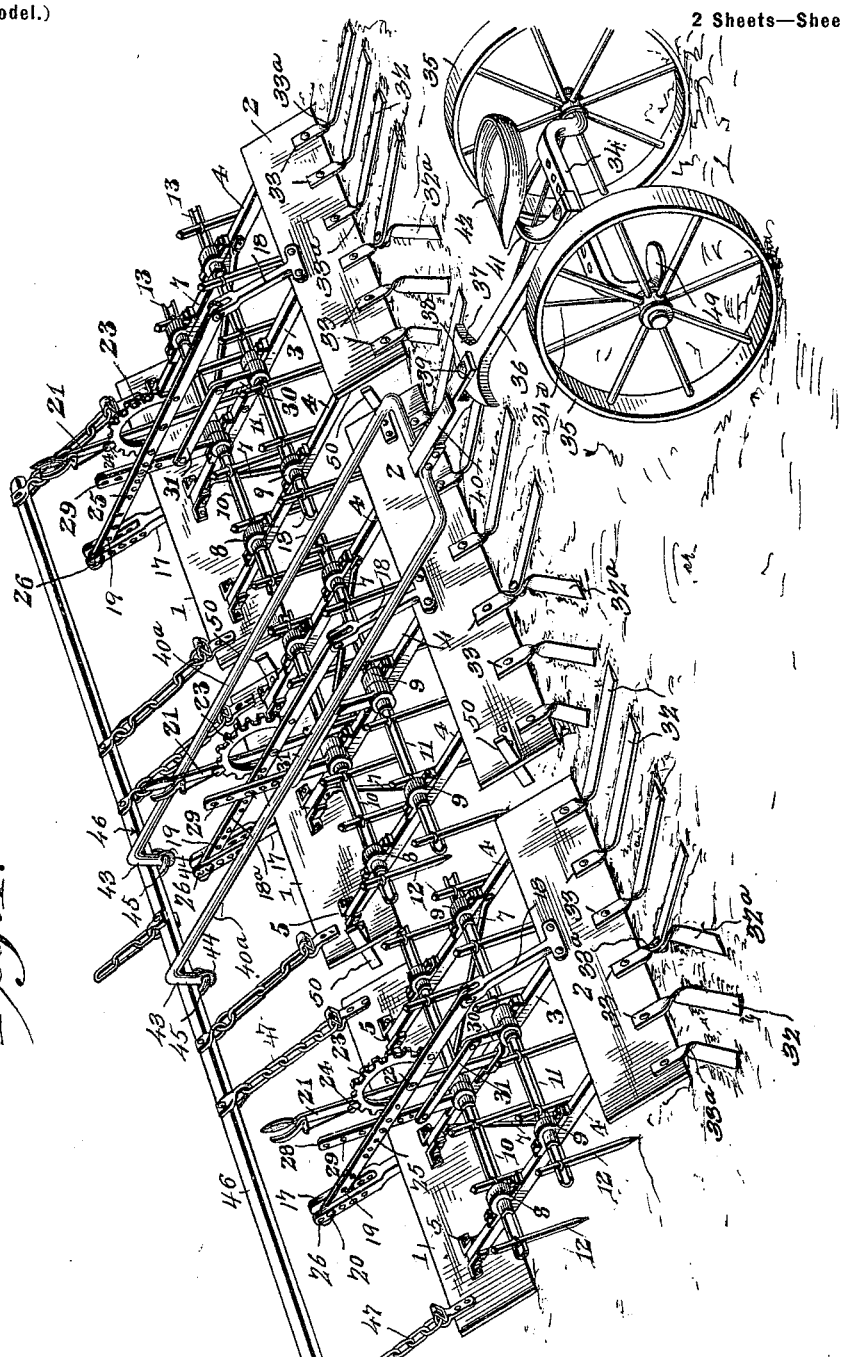

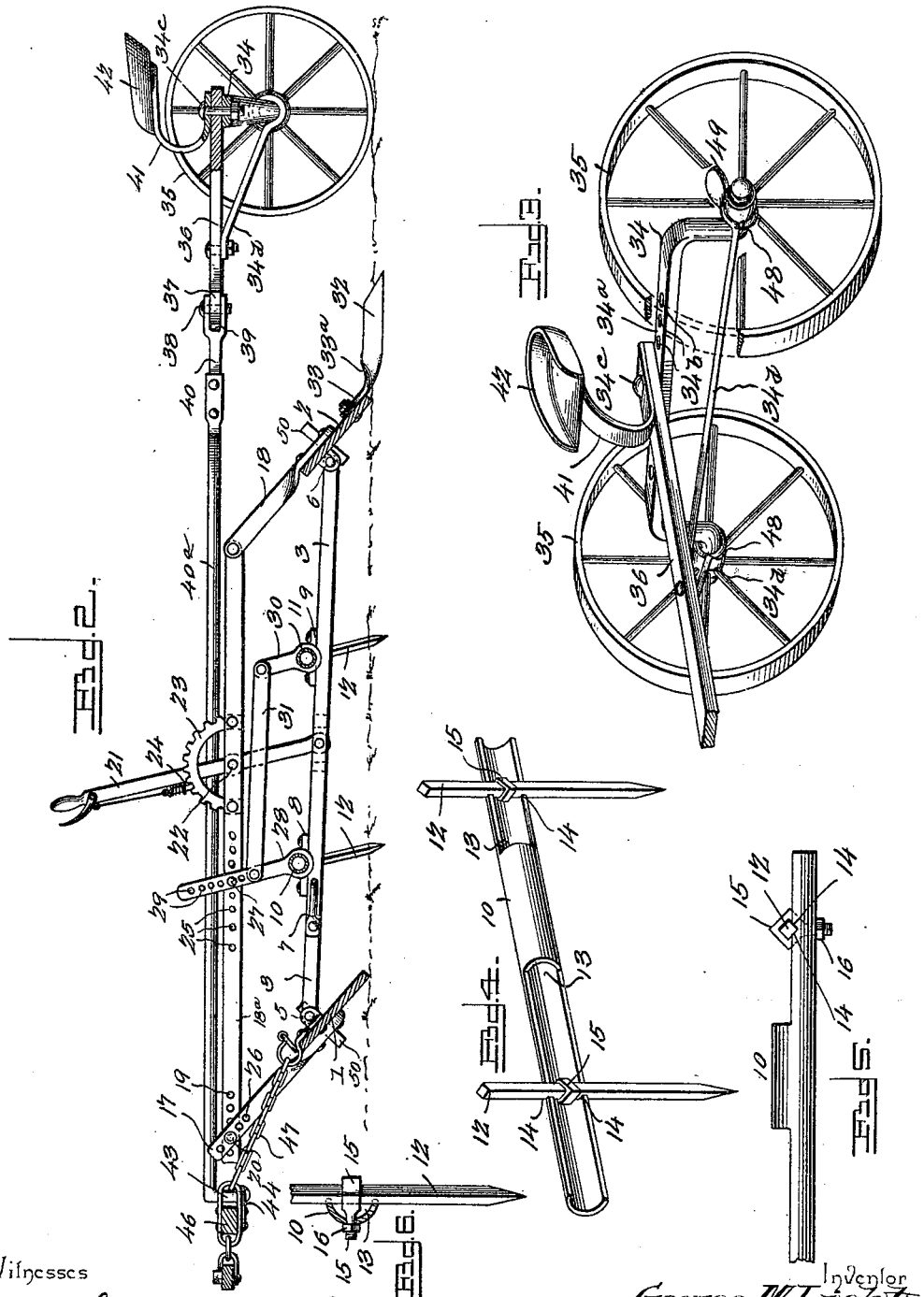

GEORGE M. LIGHT, OF POMEROY, WASHINGTON.

LAND-SCRAPER.

SPECIFICATION forming part of Letters Patent No. 644,614, dated March 6, 1900.

Application filed November 14, 1899. Serial No. 736,971. (No model.)

*To all whom it may concern:*

Be it known that I, GEORGE M. LIGHT, a citizen of the United States, residing at Pomeroy, in the county of Garfield and State of Washington, have invented a new and useful Land-Scraper, of which the following is a specification.

The invention relates to improvements in land-scrapers.

One object of the present invention is to improve the construction of land-scrapers and to provide a simple and comparatively-inexpensive one adapted for general leveling purposes, more especially for leveling plowed land, and capable of pulverizing the clods and of destroying the weeds.

Another object of the invention is to enable the scraper-blades to be readily set at the desired angle and to adjust the harrow-teeth and weed-cutters simultaneously and to provide a seat for the accommodation of the driver.

The invention consists in the construction and novel combination and arrangement of parts hereinafter fully described, illustrated in the accompanying drawings, and pointed out in the claims hereto appended.

In the drawings, Figure 1 is a perspective view of a land-scraper constructed in accordance with this invention, the truck for the accommodation of the driver being in position. Fig. 2 is a longitudinal sectional view of the land-scraper. Fig. 3 is a detail perspective view of the truck and the reach connections. Figs. 4, 5, and 6 are detail views illustrating the manner of mounting the harrow-teeth.

Like numerals of reference designate corresponding parts in all the figures of the drawings.

1 and 2 designate front and rear scraper-blades, arranged in pairs, as clearly illustrated in Fig. 1 of the accompanying drawings, and forming separate sections and connected by central and side longitudinal bars 3 and 4, hinged at their front and rear ends 5 and 6 to the front and rear scraper-blades, whereby the latter are adapted to be arranged at the desired inclination to produce the proper effect on the soil. The connecting-bars 3 and 4 are supported by bracing-rods 7 to form a frame, and these bracing-rods 7 are secured at their rear ends to the side longitudinal bars and at their front ends to the central longitudinal bar. The front and rear scraper-blades 1 and 2 are of different lengths in order to break joints and prevent the machine from leaving any ridges.

The longitudinal bars are provided with front and rear bearings 8 and 9, consisting of straps or clips and receiving shafts or rods 10 and 11, carrying harrow-teeth 12 and preferably constructed of tubular metal. The tubular metal is continuous at the bearings and is cut away between the bearings at 13. The cut-away portions 13, which present concave faces to the harrow-teeth, are provided at their upper and lower edges with notches 14, receiving the teeth, which are secured in the notches by eyebolts 15. The eyebolts 15 pass through perforations of the shafts or rods and are provided at the front faces thereof with nuts 16. The harrow-teeth are preferably rectangular in cross-section, and the eyes of the bolts and the notches of the shafts or rods conform to the configuration of the teeth, whereby the latter are securely held at the desired adjustment. By loosening the nuts of the eyebolts the harrow-teeth may be adjusted vertically and arranged to penetrate the soil to the desired depth. The front scraper-blades level the soil and press the clods, which are broken by the harrow-teeth, and the rear scraper-blades smooth and pack the soil.

The front and rear scraper-blades are provided with upwardly-extending arms 17 and 18, which are forked or bifurcated to receive an adjustable connecting-rod or bar 18ª. The rear end of the latter is permanently pivoted in the fork or bifurcation of the rear arm, and its front end is provided with a series of perforations 19 and is adjustably secured by a fastening device 20 in the fork or bifurcation of the arm 17, which extends above the rear arm 18. By adjusting the front end of the rod or bar 18ª the blades 1 and 2 may be arranged in parallel planes or set at an angle to each other. This permits the front scraper-blades to be arranged at a slight inclination, nearly vertical, to adapt them for leveling the land and for breaking the lumps, and by arranging the rear scraper-blades at a greater inclination they will operate to pack the soil after the same has been leveled by the front scraper-blades.

The front and rear scraper-blades are adjusted simultaneously to change their inclination by means of an operating or shifting lever 21, fulcrumed at its lower end on the central connecting-bar 3 and connected between its ends by a pivot 22 to the bar or rod 18$^a$. It is secured at the desired adjustment by means of a ratchet 23 and a pawl or dog 24, the ratchet being mounted on the bar or rod 18$^a$ and the pawl or dog being carried by the operating or shifting lever. The rod or bar 18$^a$ is provided in advance of the ratchet with a series of perforations 25, similar to the perforations 19 of the front end of the bar, to receive a pivot 27 for adjustably connecting an arm 28 of the front rod or shaft to the bar or rod 18$^a$. This arm 28, which is suitably fixed to the front rod or shaft, is provided with a series of perforations 29, and it is connected at a point below the bar or rod 18$^a$ with a rear arm 30 by a short connecting-bar 31. The rear arm 30 is fixed to the rear rod or shaft, and by this construction the harrow-teeth are adjusted simultaneously with the scraper-blades.

Each rear scraper-blade is provided with rearwardly-extending cutting-blades 32, designed for operating on weeds and having short shanks 33 at their front ends, which are detachably secured to the rear faces of the scraper-blades 2. The weed-cutting blades, which diverge from the center of the scraper-blade, are preferably constructed of flat metal and have quarter-bends 33$^a$ adjacent to the shanks to set their lower cutting edges at the proper angle, and their rear ends are tapered. The body portion of each weed-cutting blade is disposed at an angle to the short shank and inclines from its upper or back edge to its lower or cutting edge. One of the central weed-cutting blades is provided with a short blade 32$^a$, diverging from its body portion and operating in the space between the two approximately-central weed-cutting blades. The shank of the short blade 32$^a$ is arranged at an angle to the body portion and is secured to the rear face of the contiguous central blade. The weed-cutting blades may be arranged to operate in practically a horizontal plane, or they may be disposed at an inclination, and it will be readily apparent that by adjusting the scraper-blades the weed-cutting blades may be set in the desired position and held thereat.

In order to accommodate the driver, a rear truck is provided, and it consists of a drop-axle 34 and carrying-wheels 35, having broad peripheries or rims to prevent them from sinking into the soil. The drop-axle is provided with a flat top portion 34$^a$, having a series of perforations 34$^b$ and connected with a rear reach-section 36, which is provided at its front end with a segmental head 37, pivoted by a pin 38 in a bifurcation 39 of a front reach-section 40. The rear reach-section, which is preferably constructed of flat metal, as shown, has its rear end resting upon the flat portion of the axle and secured to the same by means of a suitable fastening device 34$^c$, which also secures a spring-standard 41 of a seat 42 to the truck. The perforations of the flat top portion of the axle enable the position of the seat to be changed from one side of the center to the other to locate it at the high side when the land-scraper is operating on a hillside, whereby the truck may be properly balanced to prevent it from upsetting. The arms of the axle are connected with the rear section of the reach by braces or hounds 34$^d$, secured to the reach by a bolt or other suitable fastening device and provided at their rear ends with eyes which are linked into suitable eyes 48 of the axle, and the latter is provided at one side with a rearwardly-extending step 49 to enable the operator to readily mount the truck.

The reach, which is composed of the front and rear sections, has its joint arranged in rear of the weed-cutting blades, and it is adapted to permit the machine to be turned easily without the wheels striking the said blades. The segmental head of the rear reach-section supports the same in turning the machine and prevents the riding attachment or truck from twisting or upsetting.

In order to prevent the front and rear scraper-blades from binding against each other in turning the machine, the central section is provided with fenders 50, consisting, substantially, of L-shaped plates or pieces secured to the front and rear faces of the front and rear blades, at each end thereof, and forming forwardly and rearwardly projecting fenders located in substantially the same plane as the edges of the central blades and forming a bearing for the scraper-blades of the end sections.

The front reach-section 40 is forked to clear the central operating mechanism, the fork being formed by two rods 40$^a$, provided at their front ends with depending arms 43, terminating in lower eyes 44, which are linked into suitable eyes 45 of a transverse bar 46, and the latter is also connected by chains 47 with the front scraper-blades. The transverse bar 46 may be provided with any desired arrangement of whiffletrees for the attachment of the draft-animals.

What is claimed is—

1. A machine of the class described comprising a frame, front and rear scraper-blades movably connected with the frame and adapted to be arranged at an inclination, harrow-teeth also movably mounted on the frame and adapted to be arranged at an inclination, and operating mechanism connected with the scraper-blades and the harrow-teeth and adapted to adjust the same, substantially as described.

2. A machine of the class described comprising front and rear blades, adapted to be set at an inclination, a frame connecting the blades, a shaft journaled on the frame and carrying harrow-teeth adapted to be arranged at an inclination, and operating mechanism connected with the blades and with the shaft, whereby the teeth and the blades are simultaneously adjusted, substantially as described.

3. A machine of the class described comprising front and rear scraper-blades, a frame connecting the blades and having the same hinged to it, shafts journaled on the frame, arms fixed to the blades and to the shafts, a bar connected with the said arms, and a lever for adjusting the bar, substantially as described.

4. A machine of the class described comprising a frame, front and rear scraper-blades hinged to the frame and adapted to be arranged at an inclination, shafts journaled on the frame and carrying harrow-teeth, the front and rear arms extending upward from the scraper-blade and from the shafts, a bar 18$^a$ connected with the arms of the scraper-blades and with the front arm of the shafts, a short bar connecting the arms of the shafts, and means for adjusting the bar 18$^a$, substantially as described.

5. A machine of the class described comprising the front and rear scraper-blades adapted to be arranged at an inclination to engage the surface of the ground, and the rearwardly-disposed cutting-blades secured to the rear scraper-blades, and arranged substantially at right angles to the same, and adapted to be adjusted simultaneously with the scraper-blades, substantially as described.

6. A machine of the class described comprising a frame, front and rear scraper-blades hinged to the frame, and adapted to engage the surface of the ground, the rearwardly-disposed weed-cutting blades having shanks secured to the rear scraper-blades, and means for adjusting the scraper-blades, whereby the weed-cutting blades may be set at the desired inclination, substantially as described.

7. A machine of the class described comprising a series of sections composed of front and rear scraper-blades connected together, a reach extending rearward from the sections and connected with the same at the front thereof and provided between its ends with a joint, a truck connected with the reach, and a seat supported above the truck, substantially as described.

8. A machine of the class described comprising a series of sections composed of front and rear scraper-blades, a reach connected with the sections and composed of two sections pivoted together, one of the reach-sections being provided with a segmental head, and a seat-supporting truck arranged at the rear end of the reach, substantially as described.

9. A machine of the class described comprising a series of sections composed of front and rear scraper-blades, operating mechanism for adjusting the blades, a transverse bar connected with the front blades, a truck provided with a seat and having a reach composed of pivotally-connected front and rear sections, the front section being forked to clear the operating mechanism and connected with the transverse bar, substantially as described.

10. A scraper composed of sections having front and rear blades and provided with fenders adapted to prevent the blades from binding when turning the scraper, substantially as described.

11. A scraper composed of sections having front and rear blades and provided with fenders composed of substantially L-shaped pieces secured to the front and rear faces of the blades of one section and arranged to be engaged by the blades of the adjacent section, substantially as described.

12. A machine of the class described comprising a series of sections composed of front and rear scraper-blades, a truck provided with a drop-axle and having a reach provided in rear of the said sections with a joint, and a seat adjustably mounted on the top portion of the axle, substantially as described.

13. A machine of the class described comprising a frame, front and rear scraper-blades arranged to engage the surface of the ground, and the rearwardly-diverging weed-cutting blades constructed of flat metal, said weed-cutting blades consisting of shanks secured to the rear scraper-blade, and weed-engaging portions arranged at an angle to the shanks and connected with the same by quarter-bends, substantially as described.

In testimony that I claim the foregoing as my own I have hereto affixed my signature in the presence of two witnesses.

GEORGE M. LIGHT.

Witnesses:
S. G. COSGROVE,
J. O. RUMMENS.